POWER OPERATED CLEANING DEVICE

Filed Jan. 28, 1966 3 Sheets-Sheet 1

INVENTORS
Morton Goldstein
Roberta I. Goldstein
BY Polachek & Saulsbury
ATTORNEYS

POWER OPERATED CLEANING DEVICE

Filed Jan. 28, 1966

INVENTORS
Morton Goldstein
Roberta I. Goldstein
BY
Polachek & Saulsbury
ATTORNEYS

POWER OPERATED CLEANING DEVICE

Filed Jan. 28, 1966 3 Sheets-Sheet 3

INVENTORS
Morton Goldstein
Roberta I. Goldstein
BY
Polachek & Saulsbury
ATTORNEYS

United States Patent Office 3,343,192
Patented Sept. 26, 1967

3,343,192

POWER OPERATED CLEANING DEVICE

Morton Goldstein and Roberta I. Goldstein, both of 156 Truman Terrace, Paramus, N.J. 07652

Filed Jan. 28, 1966, Ser. No. 523,710
1 Claim. (Cl. 15—23)

This invention concerns a battery powered motorized scouring device for cleaning pots and other utensils.

One object of the invention is to provide a motorized cleaning device having a casing containing a self contained rechargeable battery to energize the motor, with novel means for sealing the casing to prevent entry of water.

Another object is to provide a device of the character described, with means for quickly mounting a flexible scouring head on the shaft of the battery driven motor.

Still another object is to provide a device of the character described, wherein the scouring head is coupled to the motor by an elongated flexible shaft to facilitate scouring deep pots, pitchers, jars and other large utensils.

A further object is to provide a cleaning device of the character described, wherein the scouring head has a cup-shaped quickly attachable and removable scouring pad.

A still further object of the invention is to provide a device of the character described, having an attachable pistol handle for prolonged polishing or buffing.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

Figures 1, 2, 7, 15:
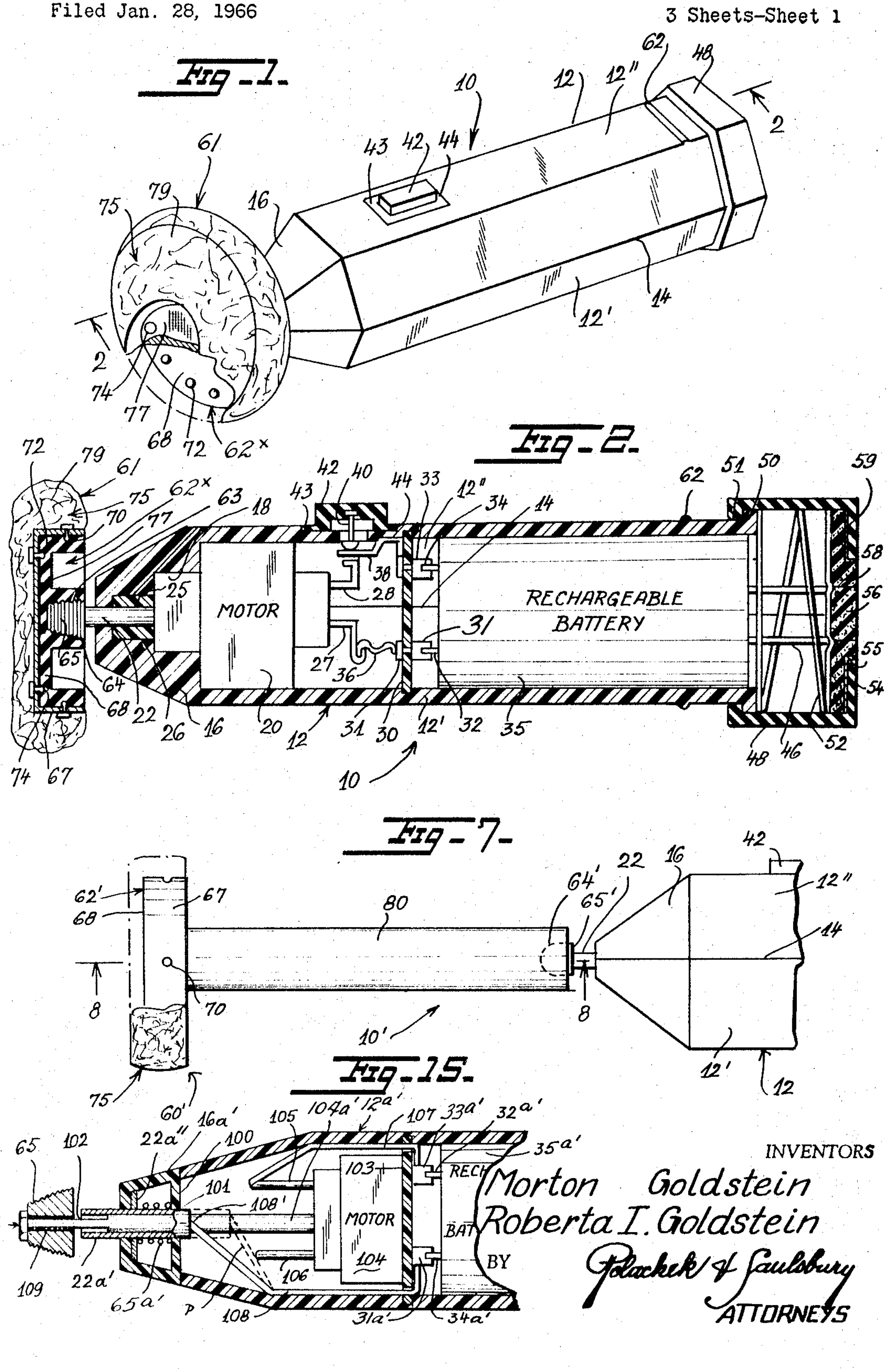
FIGURE 1 is a perspective view of a device embodying the invention, parts being shown broken away.
FIG. 2 is an enlarged longitudinal sectional view taken on line 2—2 of FIG. 1.
FIG. 7 is a side view showing part of another device embodying the invention.
FIG. 15 is a cross-sectional view showing a modified form of the motor control means.
Figures 3, 4, 5, 6, 8, 9, 10:
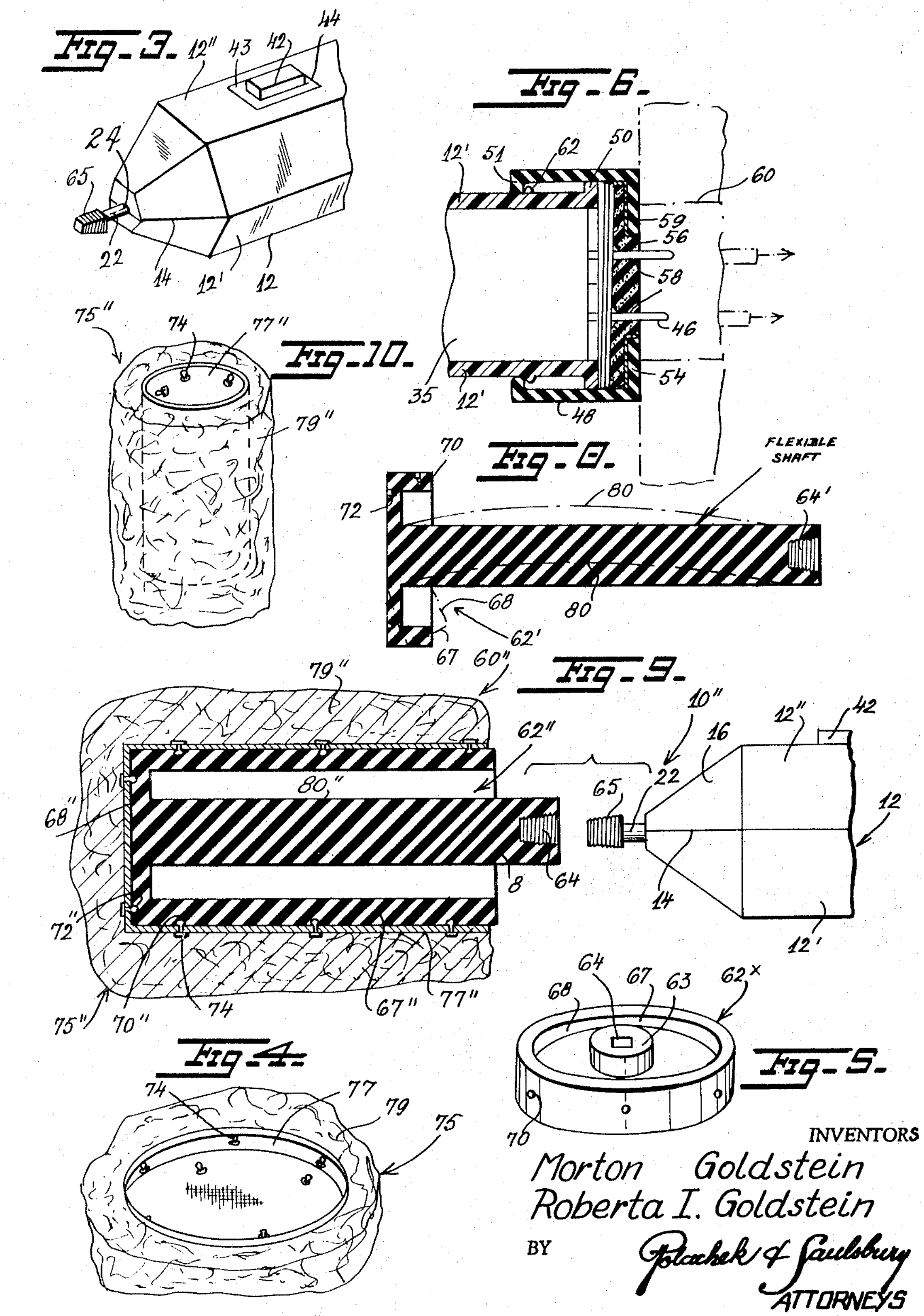
FIG. 3 is a fragmentary perspective view of the front end of the device with scouring head removed.
FIG. 4 is a perspective view of a scouring pad in inverted position.
FIG. 5 is a perspective view of part of a scouring head in inverted position.
FIG. 6 is a fragmentary sectional view similar to a part of FIG. 2, with end closure cap in a retracted position.
FIG. 8 is a longitudinal sectional view taken on line 8—8 of FIG. 7, showing construction of part of the scouring head of the device.
FIG. 9 is a longitudinal sectional view of another scouring head with part of the motor driven device shown in side elevation.
FIG. 10 is an oblique side view of the scouring pad employed on the scouring head of FIG. 9.

Referring first to FIGS. 1–3, there is shown a motorized scouring device 10 embodying the invention. This device comprises an elongated hollow casing 12 which is hexagonal in cross section. The casing is formed from two semi-hexagonal shells 12' and 12'' secured together at abutting edges 14 in a moistureproof seal. The casing has a tapered forward end 16 provided with a recess 18 in which is seated an electric motor 20. The motor has an axial shaft 22 which extends outwardly to bore 24 formed in the forward end of the casing. A cylindrical bearing 25 made of nylon is seated in a recess 26 in end 16 to support the shaft and to seal the front end of the casing from moisture. The motor has a pair of spring terminals 27, 28 at its rear end.

An insulated partition 30 is disposed transversely of the casing. This partition carries two socket terminals 31, 33. A rechargeable battery 35 is removably disposed in the casing. This battery has terminals 32, 34 engaged in socket terminals 31, 33 respectively. Terminal 31 is connected by wire 36 to motor terminal 27. Motor terminal 28 is slightly spaced from a spring contact 38 connected to and supported by socket terminal 33. A pushbutton switch pin 40 is supported by a flexible inverted cup shape member 42. The pushbutton pin 40 bears against spring contact 38. The cup shaped member 42 has a flange 43 secured in a moistureproof seal in recess 44 formed at the top of the casing. When the flexible top wall of member 42 is pressed down, the contact 38 contacts terminal 28 and electrically closes the power supply circuit of the motor.

The battery has a built-in rectifier provided with a pair of prongs 46 which extend rearwardly of the battery. The prongs are normally concealed within a hexagonal cap 48 slidably fitted on the rear open end of the casing. The casing is provided with an annular bead 50 which engages inturned flange 51 formed on the forward edge of the cap. A coil spring 52 in the cap is disposed between the rear end of the casing and rear wall of 54 of the cap to hold the cap in extended position as shown in FIG. 2. The rear wall 54 has an aperture 55 in which is fitted a soft, sponge rubber plug 56. The plug has two slits 58 which are normally closed to exclude moisture from the interior of the casing. The plug is secured by cement 59 in the cap. The cap can be retracted by pushing it forwardly on the casing to the position shown in FIG. 6. Then the prongs 46 will project out through slits 58 and can be engaged in a suitable power supply receptacle 60 for recharging the battery. Two ridges 62 are formed at upper and lower sides of the casing forwardly of bead 50. Flange 51 engages on these ridges to hold the cap retracted. The cap is made of flexible material so that it snaps over the ridges in retraction and extension of the cap. The flange 51 can also be forced over bead 50 to remove the cap from the casing so that the battery can be removed from the casing.

The device is provided with a scouring head 61. This head comprises a flexible cup shaped member 62x having an axially extending boss 63 provided with a tapered recess 64 which is roughened on the inside and is rectangular in cross section. This recess detachably receives a tapered key 65 secured on the end of the motor shaft 22. The key is rectangular in cross section and has a roughened surface. This key frictionally engages in recess 64 to hold head 61 removably on the motor shaft.

The member 62x has a flexible lateral cylindrical wall or skirt 67 which is integral with circular end wall 68; see FIG. 5. Holes 70 are formed in circumferentially spaced positions around the outside of wall 67 and further holes 72 are formed in circumferentially spaced positions on the outer, front side of wall 68. These holes receive snap fastener studs 74 extending inwardly of scouring pad 75. The pad has a cup shaped flexible cloth or plastic liner 77 carrying the studs 74 in position for engaging in holes 70, 72 in member 62x; see FIG. 4. On the outer side of liner 77 is secured a fibrous cover 79 made of steel wool or the like.

Operation of the device will be readily apparent from an inspection of FIGS. 1–6. The scouring pad 75 can be easily detached from the member 62x when worn out and a new pad can easily be snapped in place on member 62x. The entire head 61 can easily be removed from the motor shaft 22. This may be desired in order to install anothr type of head 60' or 60'' shown in FIGS. 7–10. When switch cover member 42 is pressed the motor is energized and the motor rapidly rotates the head 61 for cleaning a pot or other utensil while the user holds the switch assembly including button 40, contact 38, and terminal 28 in closed position. When member 42 is released, the switch assembly opens as contact 38 separates from terminal.

The head 60' shown in FIGS. 7 and 8 is generally similar to head 61 and corresponding parts are identically numbered. Head 60' employs removable pad 75 which has already been described. Head member 62' has an elongated flexible axial shaft 80 which is integral with circular front end wall 68. The shaft 80 is longer than the diametral width of member 62'. The rear end of cylindrical shaft 80 is provided with tapered rectangular recess 64' which receives key 65' of the motor shaft 22. Device 10' employing head 60' can be used to clean and scour utensils such as deep pots, pitchers and the like. The flexible shaft 80 and the flexible walls 67' and 68' conform to any irregularities in the surfaces so that they can be cleaned thoroughly and quickly.

For cleaning long narrow utensils such as bottles and jars, there is provided another type of head 60'' for device 10'' shown in FIGS. 9 and 10. This head has a cup shaped member 62'' provided with long axial flexible cylindrical shaft 80''. The flexible outer cylindrical wall 67'' is axially lengthened so that it is almost as long as flexible shaft 80. Holes 70'' and 72'' are spaced axially and circumferentially on the outer side of walls 67'' and 68'' to receive snap fastener studs 74'' of scouring pad 75''. Pad 75'' is similar to pad 75 except that the cylindrical side wall of cover 79'' is lengthened to cover the exterior of exterior wall 67'' of member 62''. Pad 75'' has a liner 77'' provided with inwardly extending spaced studs 74'' shown in FIGS. 9 and 10. The pad can readily be removed by turning it inside out as it is removed from member 62''. A new pad can be inserted axially on the member 62'' and then studs 74' can be snapped into holes 70'', 72''.

The heads 61, 60' and 60'' are readily interchangeable on the key 65 of the motor shaft, for performing different cleaning and scouring functions. The flexible walls of the heads conform to any irregular surfaces they may encounter. The device is light in weight and can comfortably be held in the head while in use. When not in use it can be engaged in a convenient power supply receptacle for recharging the battery so that the device always operates at full power. The device has a moisture-proof construction at front and rear ends as well as at the switch assembly so that water and debris cannot enter. The device will prove to be a useful, handy household accessory. It can be manufactured at relatively low cost. Parts are readily removable for replacement or repair.

Figures 11, 12, 13, 14:
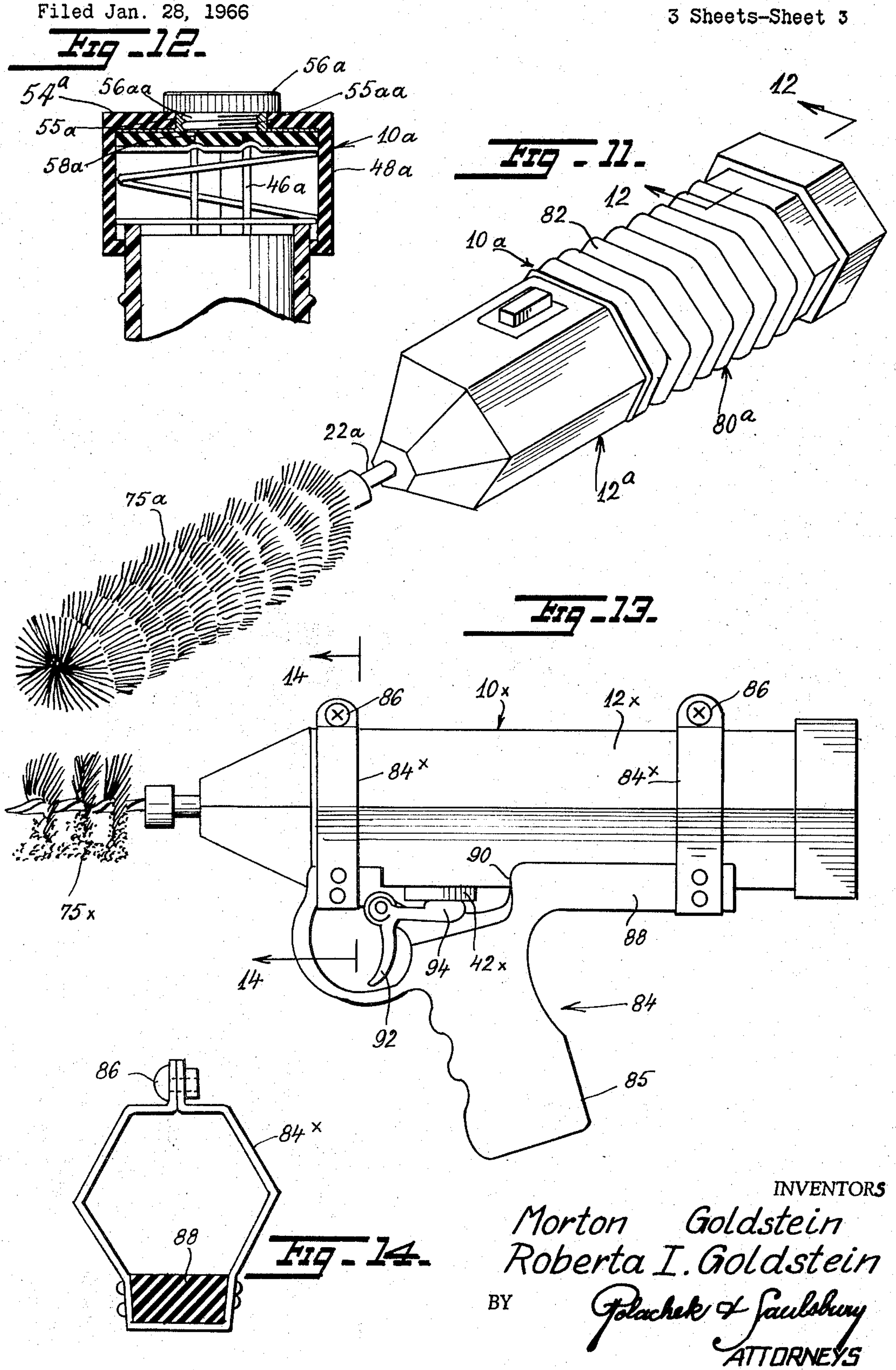
FIG. 11 is a view similar to FIG. 1 of a device embodying still another modified form of the invention.
FIG. 12 is a sectional view taken on the line 12—12 of FIG. 11.
FIG. 13 is a side elevational view of a device embodying a further modified form of the invention.
FIG. 14 is a cross-sectional view taken on the line 14—14 of FIG. 13.

With particular reference to FIGS. 11 and 12, herein the inventive concept is embodied in a motorized brush or cleaning device 10a which differs from the scouring device 10 of FIG. 1 in that an elongated cylindrical brush 75a is fastened to the driven shaft 22x of the motor in place of the head 61 and scouring pad 75. The brush 75a is suitably designed for cleaning elongated narrow bottles such as nursing bottles.

In cleaning device 10a, in place of a sponge rubber plug 56, the opening 55a in the rear wall 54a of the cap 48a is plugged by means of a knurled cap 56a with an externally screw threaded neck 56aa coacting with internal threads 55aa in the opening 55a. The cap 48a functions similar to cap 48 of FIG. 1. When the cap 46a is removed, the prongs 46a project through the slits 58a and out through the opening 55a.

Another important feature of the cleaning device 10a is the provision of a tubular hand grip 80a sleeved over the outer surface of the elongated casing 12a. The hand grip is formed of rubber with its body corrugated as indicated at 82 to provide a better gripping surface.

FIGS. 13 and 14 illustrate another modified form of motorized cleaning device 10x which differs from the cleaning device 10a of FIGS. 11 and 12 in that in place of the hand grip 80a of FIG. 11, a pistol shaped hand grip 84 is attached to the elongated casing 12x by means of a pair of split-ring-shaped spring metal brackets 85, 85 fastened to the casing by bolt and nut assemblies 86, 86. The pistol shaped grip 84 has an elongated grooved body 88 to receive the body of the casing 12x and a grooved hand piece 85. The grooved body is cut away as indicated at 90 to accommodate the push button switch 42x of the casing. A spring-pressed trigger device including a finger piece 92 and a hammer head 94 is pivotally connected to the grooved body adjacent the cutaway portion so that when pulled inwardly or to the right as viewed in FIG. 13, the hammer head will push the button inwardly closing the circuit through the motor for rotating the brush 75x.

In FIG. 15, there is shown a construction in which an axial sleeve 22a' is axially slidable in the tapered forward end 16a' of the plastic casing. Within the forward end 16a' and secured to the sleeve 22a intermediate its length is a flexible sealing diaphragm 22a'' engaging a helical spring 65a' anchored against a partition wall 100 and tending to push outwardly the sleeve 22a'; the diaphragm 22a' serves to provide an effective sealing arrangement against water. The sleeve is slidable in and guided through openings 101 and 102 in the forward end structure 16a'.

The rechargeable battery 35a' is similarly connected by its terminals 32a' and 34a' with socket terminals 31a' and 33a' carried on a partition wall 103 against which a motor 104 abuts within the casing. The motor has forwardly-extending terminals 105 and 106. Socket terminal 31a' is connected by a cable 107 with the terminal 105. The socket terminal 33a' is connected by a conductor 108 with the end of the sleeve 22a' at 108'. The conductor 108 is in the form of a spring and as the sleeve 22a' is pressed inwardly by application of the head 61, the wire 108 will move to a dotted line position indicated at P and will engage the end of the terminal 106 to cause the operation of the motor. A motor shaft 104a' extends through the sleeve 22a' and is in driving relationship with the key 65. Accordingly when pressure is applied to the axial sleeve, 22a', the sleeve 22a' will cause the spring contact wire 108 to engage the motor terminal 106 and start the operation of the motor. The spring 65a' returns the sleeve 22a', the motor shaft 104a' having driven the tapered key 65 and the head 61. The head 65 is axially slidable upon the end of the motor shaft 104a' as indicated at 109 to provide lost motion for the axial sliding of the sleeve 22a' upon the motor shaft 104a'.

It will also be understood that a switch mechanism may be placed in the forward end 16a' of casing 12a' in the path of movement of a movable part of the device and actuated by said movable part instead of being actuated by an outside agency.

While I have illustrated and described the preferred embodiments of my invention, it is to be understood that I do not limit myself to the precise construction herein disclosed and that various changes and modifications may be made within the scope of the invention as defined in the appended claim.

What is claimed is:

In a portable cleaning and scouring device, an elongated hollow casing open at one end and closed at the other end, the closed end having a bore, a low-voltage drive motor in the closed end of the casing, a shaft driven by said motor and extending through said bore to the exterior of the casing, a rechargeable electric battery in the casing at the other open end of the casing, means of operative connection between the motor and battery including a pair of fixed contacts extending radially of the motor, a fixed contact on the battery connected to one of said fixed contacts on the motor, and a movable contact on the battery adapted to be moved into contact with the other fixed contact on the motor, a pair of prongs extending from the battery and forming an extension thereof, a compression spring sleeved around the prongs, in spaced relation thereto, and an insulated cap slidably mounted on the open end of the casing concealing the prongs and plugs, said cap having an opening therein, a sponge rubber plug closing the opening in the cap, said sponge rubber plug having spaced slits therein adapted to be opened by the plugs of the battery when the cap is slid inwardly in order to expose the plugs for purpose of recharging the battery.

References Cited

UNITED STATES PATENTS

| | | | |
|---|---|---|---|
| 2,166,343 | 7/1939 | Derks | 15—230 |
| 2,496,972 | 2/1950 | Wolfe | 15—230 |
| 2,917,758 | 12/1959 | Held et al. | 15—22 |
| 3,027,507 | 3/1962 | Hubner | 320—2 |
| 3,067,373 | 12/1962 | Hopt et al. | 320—2 |
| 3,145,404 | 8/1964 | Fiedler | 15—23 |
| 3,173,417 | 3/1965 | Horner. | |
| 3,233,265 | 2/1966 | Hartman | 15—22 |

FOREIGN PATENTS

| | | |
|---|---|---|
| 1,133,470 | 11/1956 | France. |
| 1,265,888 | 5/1961 | France. |

CHARLES A. WILLMUTH, *Primary Examiner.*

E. L. ROBERTS, *Assistant Examiner.*